S. J. Tongue,
Mincing Clearer.
N° 80,242. Patented July 21, 1868.
Witnesses.
Wm A. Morgan
As. C. Cotton
Inventor:
S. J. Tongue
per Munn & Co
attorneys

United States Patent Office.

SAMUEL J. TONGUE, OF PHILADELPHIA, PENNSYLVANIA, ASSIGNOR TO HIMSELF AND JABEZ JENKINS, OF SAME PLACE.

*Letters Patent No. 80,242, dated July 21, 1868.*

IMPROVEMENT IN MINCING-CLEAVER.

*The Schedule referred to in these Letters Patent and making part of the same.*

TO ALL WHOM IT MAY CONCERN:

Be it known that I, SAMUEL J. TONGUE, of Philadelphia, in the county of Philadelphia, and State of Pennsylvania, have invented a new and useful Improvement in Mincing-Cleavers; and I do hereby declare that the following is a full, clear, and exact description thereof, which will enable others skilled in the art to make and use the same, reference being had to the accompanying drawings, forming part of this specification, in which—

The accompanying drawing represents a side view of my invention.

Similar letters of reference indicate corresponding parts.

This invention consists in combining a mincing-knife or cutter and a cleaver, in such a manner that one and the same implement may be used either in the capacity of a cleaver or a mincing-knife, as may be desired.

A represents the blade of the implement, formed with a tang, on which the handle B is secured.

The blade A is made quite broad, and its outer part is made broader than any other portion, by having one edge project or extend outward, as shown at $a$, which forms a concave at said edge, as shown clearly in the drawing. The opposite edge, $b$, of the blade, forms the cutting-edge of the cleaver, and is made slightly convex longitudinally.

The outer part, $c$, of the blade, in consequence of the expansion of the latter at its outer part, admits of a mincing or chopping-edge, $d$, being formed on it, and this edge is made quite convex, forming a portion of a circle, as clearly shown in the drawing, so that it may be used for cutting or chopping substances in a wooden bowl.

In using the implement as a cleaver, the handle B is grasped horizontally, in the usual way, the cutting-edge $b$ rising and falling in a vertical plane; but in using the device as a mincing-knife or chopper, the handle B is grasped vertically, being held in the position as shown in the drawing, and worked up and down in that position.

By this simple arrangement, a cleaver and mincing-knife are combined in one and the same implement, and at a cost not exceeding that of an ordinary cleaver alone.

Having thus described my invention, I claim as new, and desire to secure by Letters Patent—

The cutting-edge, $b$, of the cleaver, formed at one edge of the blade A, in combination with the cutting-edge, $d$, of the mincing-knife, formed on the outer end of said blade, all constructed substantially as and for the purpose set forth.

SAMUEL J. TONGUE.

Witnesses:
A. H. SHOEMAKER,
W. G. HILLMAN.